United States Patent
Kamatani et al.

(10) Patent No.: US 9,588,967 B2
(45) Date of Patent: Mar. 7, 2017

(54) INTERPRETATION APPARATUS AND METHOD

(71) Applicant: KABUSHIKI KAISHA TOSHIBA, Minato-ku, Tokyo (JP)

(72) Inventors: Satoshi Kamatani, Kanagawa (JP); Akiko Sakamoto, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/064,965

(22) Filed: Mar. 9, 2016

(65) Prior Publication Data

US 2016/0314116 A1 Oct. 27, 2016

(30) Foreign Application Priority Data

Apr. 22, 2015 (JP) ................................. 2015-087637

(51) Int. Cl.
 *G06F 17/28* (2006.01)
 *G06F 17/27* (2006.01)
 *G10L 21/055* (2013.01)

(52) U.S. Cl.
 CPC ........ *G06F 17/289* (2013.01); *G06F 17/2715* (2013.01); *G10L 21/055* (2013.01)

(58) Field of Classification Search
 CPC ... G06F 17/289; G06F 17/2715; G10L 21/055
 See application file for complete search history.

(56) References Cited

U.S. PATENT DOCUMENTS

| 6,279,018 B1 | 8/2001 | Kudrolli et al. |
| 8,090,570 B2 * | 1/2012 | Waibel ........... G06F 17/289 704/2 |

(Continued)

FOREIGN PATENT DOCUMENTS

| JP | H08-212228 | 8/1996 |
| JP | H08-263499 | 10/1996 |

(Continued)

OTHER PUBLICATIONS

Finch, Andrew, Xiaolin Wang, and Eiichiro Sumita. "An exploration of segmentation strategies in stream decoding." Proc. IWSLT. 2014.*

(Continued)

*Primary Examiner* — Brian Albertalli
(74) *Attorney, Agent, or Firm* — Knobbe, Martens, Olson & Bear, LLP

(57) ABSTRACT

According to one embodiment, an interpretation apparatus includes a translator, a calculator and a generator. The translator performs machine translation on a speech recognition result corresponding to an input speech audio from a first language into a second language to generate a machine translation result. The calculator calculates a word number based on a first time when the machine translation result is generated and a second time when output relating to a prior machine translation result generated prior to the machine translation result ends, the word number being 0 or larger. The generator omits at least the word number of words from the machine translation result to generate an abridged sentence output while being associated with the speech audio.

6 Claims, 5 Drawing Sheets

(56) References Cited

U.S. PATENT DOCUMENTS

| | | | |
|---|---|---|---|
| 8,433,580 B2* | 4/2013 | Sugiyama | G06F 17/28 704/2 |
| 2002/0161579 A1* | 10/2002 | Saindon | G06F 17/28 704/235 |
| 2008/0046229 A1* | 2/2008 | Maskey | G06F 17/2775 704/2 |
| 2008/0077390 A1 | 3/2008 | Nagao | |
| 2008/0091407 A1* | 4/2008 | Furihata | G06F 17/2827 704/4 |
| 2008/0300852 A1* | 12/2008 | Johnson | G06F 17/289 704/2 |
| 2008/0300872 A1* | 12/2008 | Basu | G06F 17/30017 704/235 |
| 2010/0324894 A1* | 12/2010 | Potkonjak | G06F 17/289 704/235 |
| 2011/0213607 A1 | 9/2011 | Onishi | |
| 2013/0144597 A1* | 6/2013 | Waibel | G06F 17/28 704/2 |
| 2014/0244235 A1* | 8/2014 | Michaelis | H04L 12/1827 704/2 |
| 2015/0081271 A1* | 3/2015 | Sumita | G10L 15/00 704/2 |
| 2015/0081272 A1 | 3/2015 | Kamatani et al. | |
| 2016/0078020 A1 | 3/2016 | Sumita et al. | |
| 2016/0092438 A1* | 3/2016 | Sonoo | G06F 17/289 704/2 |

FOREIGN PATENT DOCUMENTS

| | | |
|---|---|---|
| JP | H10-247194 | 9/1998 |
| JP | 2001-175280 | 6/2001 |
| JP | 2007-034430 | 2/2007 |
| JP | 2008-083376 | 4/2008 |
| JP | 2011-182125 | 9/2011 |
| JP | 2015-060127 | 3/2015 |
| JP | 2016-057986 | 4/2016 |

OTHER PUBLICATIONS

Oda, Yusuke, et al. "Optimizing Segmentation Strategies for Simultaneous Speech Translation." ACL (2). 2014.*

Sridhar, Vivek Kumar Rangarajan, et al. "Segmentation Strategies for Streaming Speech Translation." HLT-NAACL. 2013.*

Zheng, Jing, et al. "Implementing SRI's Pashto speech-to-speech translation system on a smart phone." Spoken Language Technology Workshop (SLT), 2010 IEEE. IEEE, 2010.*

Kolss, Muntsin, et al. "Simultaneous German-English lecture translation." IWSLT. 2008.*

Kolss, Muntsin, Stephan Vogel, and Alex Waibel. "Stream decoding for simultaneous spoken language translation." Interspeech. 2008.*

Sridhar, Vivek Kumar Rangarajan, John Chen, and Srinivas Bangalore. "Corpus analysis of simultaneous interpretation data for improving real time speech translation." Interspeech. 2013.*

* cited by examiner

| No. | Speech start time | Speech recognition result | Speech end time | Machine translation result | Translation end time | Word number | Output start time | Output end time |
|---|---|---|---|---|---|---|---|---|
| 1 | 12:00:00.000 | When I was young, | 12:00:01.000 | 私が若かった頃 | 12:00:01.200 | 5 | 12:00:01.200 | 12:00:02.450 |
| 2 | 12:00:01.200 | I met a great book called "The Art of System Development" | 12:00:04.200 | 私は「システム開発の技術」と呼ばれる素晴らしい本に会いました。 | 12:00:04.800 | 15 | 12:00:04.800 | 12:00:08.550 |
| 3 | 12:00:04.400 | which is known as programmers' bible. | 12:00:06.900 | それはプログラマの聖書として知られています。 | 12:00:07.400 | 12 | 12:00:08.550 | 12:00:11.550 |
| 4 | 12:00:07.400 | It was written by, you know, a famous engineer. | 12:00:10.400 | それは、ご存じの様に、有名なエンジニアによって書かれました。 | 12:00:11.000 | 16 | 12:00:11.550 | 12:00:15.550 |
| 5 | 12:00:10.600 | He was John Brown living not far from here in Boston. | 12:00:13.600 | 彼はここから遠くにないボストンに暮らしていたジョン・ブラウンです。 | 12:00:14.200 | 16 | 12:00:15.550 | 12:00:19.550 |
| 6 | 12:00:13.100 | And, you know, he proposed a good technic to integrate a modern system. | 12:00:17.100 | また、彼は、現代のシステムを統合するためによい技術を提案しました。 | 12:00:17.900 | 18 | 12:00:19.550 | 12:00:24.050 |
| 7 | 12:00:17.600 | Do you know what element is the most important for modern systems? | 12:00:20.600 | どの要素が現代のシステム用の最も重要なものか知っていますか。 | 12:00:21.200 | 16 | 12:00:24.050 | 12:00:28.050 |
| 8 | 12:00:21.100 | Yes, that is, yeah, modularity. | 12:00:22.600 | はい、それは、ええ、モジュラリティです。 | 12:00:22.900 | 6 | 12:00:28.050 | 12:00:29.550 |

F I G. 6

| No. | Speech start time | Speech recognition result | Speech end time | Abridged sentence | Translation end time | Abridgement time | Output start time | Output end time |
|---|---|---|---|---|---|---|---|---|
| 1 | 12:00:00.000 | When I was young, | 12:00:01.000 | 私が若かった頃 | 12:00:01.200 | 0 | 12:00:01.200 | 12:00:02.450 |
| 2 | 12:00:01.200 | I met a great book called "The Art of System Development" | 12:00:04.200 | 私は『システム開発の技術』と呼ばれる素晴らしい本に会いました。 | 12:00:04.800 | 0 | 12:00:04.800 | 12:00:08.550 |
| 3 | 12:00:04.400 | which is known as programmers' bible. | 12:00:06.900 | プログラマの聖書として知られている。 | 12:00:07.400 | 1.15 | 12:00:08.550 | 12:00:11.050 |
| 4 | 12:00:07.400 | It was written by, you know, a famous engineer. | 12:00:10.400 | それは、有名なエンジニアによって書かれました。 | 12:00:11.000 | 0.05 | 12:00:11.050 | 12:00:14.050 |
| 5 | 12:00:10.600 | He was John Brown living not far from here in Boston. | 12:00:13.600 | 彼はここから遠くないボストンに暮らしていたジョン・ブラウンです。 | 12:00:14.200 | 0 | 12:00:14.200 | 12:00:18.200 |
| 6 | 12:00:13.100 | And, you know, he proposed a good technic to integrate a modern system. | 12:00:17.100 | 現代のシステムを統合するためによい技術を提案しました。 | 12:00:17.900 | 0.3 | 12:00:18.200 | 12:00:21.950 |
| 7 | 12:00:17.600 | Do you know what element is the most important for modern systems? | 12:00:20.600 | どの要素が最も重要なものか知っていますか。 | 12:00:21.200 | 0.45 | 12:00:21.950 | 12:00:24.650 |
| 8 | 12:00:21.100 | Yes, that is, yeah, modularity. | 12:00:22.600 | モジュラリティです。 | 12:00:22.900 | 1.5 | 12:00:24.650 | 12:00:25.150 |

F I G. 7

INTERPRETATION APPARATUS AND METHOD

CROSS-REFERENCE TO RELATED APPLICATION

This application is based upon and claims the benefit of priority from Japanese Patent Application No. 2015-087637, filed Apr. 22, 2015, the entire contents of which are incorporated herein by reference.

FIELD

Embodiments described herein relate generally to an interpretation apparatus and method.

BACKGROUND

In recent years, speech language processing technology has improved, and a speech interpretation apparatus which converts a speech audio in a first language to make an output in a second language is receiving attention. Such a speech interpretation apparatus can be applied to displaying translation subtitles and adding interpretation audio at conferences or lectures. For example, a conference system which displays bilingual subtitles including both a recognition result of a speech audio in a first language and a translation result in a second language corresponding to the recognition result has been proposed.

However, a delay from a start of speaking to the start of output of a translation result corresponding to the words of the speech sometimes causes a problem. The translation result needs to be continuously output for a certain time so that a viewer can understand its meaning. Thus, when translation results are long, the amount of delay may accumulatively increase as speaking continues. For example, in a lecture or the like, when a speaker continues to speak, the display of translation subtitles corresponding to the words of the speaker may gradually lag, thereby making it difficult for audience to understand the meaning. However, a simple reduction in output duration of the translation result may make it difficult to understand the meaning. The number of letters or words which a viewer can understand in a certain time is limited. Therefore, when the output duration of a translation time is short, there is concern that the output may be terminated before a viewer understands the meaning (or finishes reading).

BRIEF DESCRIPTION OF THE DRAWINGS

FIG. 5 illustrates abridgement rules.

FIG. 6 is a flowchart illustrating an operation result of an interpretation apparatus corresponding to an comparative example of the interpretation apparatus of FIG. 1, FIG. 7 is a flowchart illustrating an operation result of the interpretation apparatus of FIG. 1.

DETAILED DESCRIPTION

Figure 1:
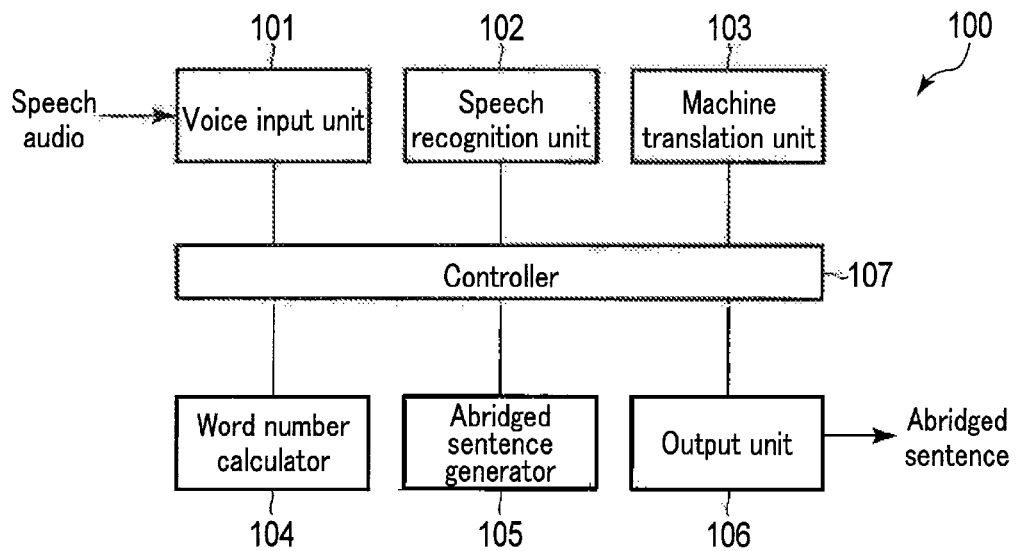
FIG. 1 is a block diagram illustrating an interpretation apparatus according to a first embodiment.

Hereinafter, embodiments will be described with reference to the drawings.

According to one embodiment, an interpretation apparatus includes a speech recognition unit, a translator, a calculator and a generator. The speech recognition unit performs a speech recognition process on an input speech audio to generate a speech recognition result. The translator performs machine translation on the speech recognition result from a first language into a second language to generate a machine translation result. The calculator calculates a word number based on (a) a first time when the machine translation result is generated and a second time when output relating to a prior machine translation result generated prior to the machine translation result ends, the word number being 0 or larger, or (b) a time length during which input of the speech audio continues and a time length corresponding to a total number of words included in the machine translation result corresponding to the speech audio, the word number being 0 or larger. The generator omits at least the word number of words from the machine translation result to generate an abridged sentence output while being associated with the speech audio.

In the drawings, the elements which are the same as or similar to those previously described are as signed with the same or similar reference numerals or symbols, and redundant descriptions will basically be omitted.

Hereinafter, interpretations from speech audio in English to text in Japanese will be described. However, the languages of the speech audio and interpretation texts are not limited to English or Japanese, and various languages can be used. Furthermore, the embodiments also allow for multiple languages to be interpreted simultaneously.

(First Embodiment)

As illustrated in FIG. 1, an interpretation apparatus 100 according to the first embodiment includes a voice input unit 101, a speech recognition unit 102, a machine translation unit 103 (a translator), a word number calculator 104 (a calculator), an abridged sentence generator 105 (a generator), an output unit 106 and a controller 107. In the interpretation apparatus 100, the control unit 107 controls the operation of each unit.

The voice input unit 101 receives a speech audio of a speaker in a format of a digital audio signal. An existing voice input device, such as a microphone, may be used as the voice input unit 101. The voice input unit 101 outputs the digital audio signal to a speech recognition unit 102.

The speech recognition unit 102 receives the digital audio signal from the voice input unit 101. The speech recognition unit 102 performs a speech recognition process on the digital audio signal to generate a speech recognition result in a text format expressing the content of the speech audio.

The speech recognition unit 102 can perform the process by using various automatic speech recognition techniques such as a Hidden Markov Model. The speech recognition unit 102 outputs the speech recognition result to the machine translation unit 103.

The machine translation unit 103 receives the speech recognition result from the speech recognition unit 102. The machine translation unit 103 performs machine translation on the speech recognition result which is in a text in a first language (which may be referred to as a source language) into a text in a second language (which may be referred to as a target language) to generate a machine translation result in a text format.

The machine translation unit 103 can perform the process by utilizing various machine translation techniques, such as the transfer method, the example-base method, the statistical method, the intermediate language method, etc. The machine translation unit 103 outputs the machine translation result to the word number calculator 104 and the abridged sentence generator 105.

The word number calculator 104 receives the machine translation result from the machine translation unit 103. The word number calculator 104 reads time data from the controller 107 that will be described later. The word number calculator 104 calculates the number of words (hereinafter referred to as "abridged word number"), which is 0 or a larger value, based on a time (first time) when the machine translation result is generated, and a time (second time) when output relating to a prior machine translation result generated prior to the machine translation result ends. The machine translation unit 104 outputs the abridged word number to the abridged sentence generator 105.

For example, the word number calculator 104 may calculate the abridged word number based on a delay time from generation of a machine translation result to an end of the output relating to a prior machine translation result that was generated prior to the machine translation result (i.e., a time difference between the first time and the second time). Alternatively, the word number calculator 104 may calculate the abridged word number based on the first time, the second time, a time length (corresponding to an output duration to be described later) corresponding to the total number of words included in the machine translation result, a third time when an input of speech audio corresponding to the machine translation result ends, and a permissible delay time from the end of the input of the speech audio to an end of output of an abridged sentence (to be described later).

Alternatively, the word number calculator 104 may calculate the abridged word number based on a time length during which input of the speech audio continues and a time length corresponding to the total number of words included in the machine translation result corresponding to the speech audio.

The abridged sentence generator 105 receives the machine translation result from the machine translation unit 103. The abridged sentence generator 105 also receives the abridged word number from the word number calculator 104. The abridged sentence generator 105 omits at least the abridged word number of words (words to be omitted) from the machine translation result to generates an abridged sentence. The abridged sentence generator 105 outputs the abridged sentence to the output unit 106.

Specifically, the abridged sentence generator 105 determines a word to be omitted from among the words included in the machine translation result based on abridgement rules illustrated in FIG. 5. The word to be omitted may be determined not only in units of words, but also in units of word groups including, for example, one content word and zero or more function words following the content word. The abridged sentence generator 105 repeats the process based on the abridgement rules until the total number of words to be omitted exceeds the abridged word number, or all the abridgement rules have been applied. When a plurality of candidate words to be omitted to which the same abridgement rule is applicable are found in a machine translation result, the abridged sentence generator 105 may search for a common word first reached based on the modification relation of each candidate word, and may omit the candidate word furthest from the common word prior to the other candidate words.

The abridged sentence generator 105 may determine the word to be omitted by using a sentence abridging technique, such as evaluation of importance of a word in a specific field, discourse structure analysis, or topic analysis. The importance of a word is evaluated based on, for example, whether information is new or old, and a prepared word list. The prepared word list maybe created by manually or automatically extracting words included in material of a lecture, for example, In addition, the abridged sentence generator 105 may omit words by, instead of deleting words, replacing a word including many letters with a synonym (abbreviation) including few letters (e.g., replacing "デスクトップ パブリッシング" with "DTP") based on previous knowledge of a viewer. The words that may be replaced with abbreviations may be listed in advance.

The output unit 106 receives an abridged sentence from the abridged sentence generator 105. The output unit 106 may display a text of the abridged sentence by using a display device, such as a display, and may audio-output the text of the abridged sentence by using an audio output device, such as a speaker, The audio output of the output unit 106 may be made by using various artificial-voice techniques, such as voice segment editing voice synthesis, format voice synthesis, speech corpus-based voice synthesis, and text-to-speech.

The controller 107 controls each unit of the interpretation apparatus 100. Specifically, the controller 107 receives and transmits data from and to each unit of the interpretation apparatus 100. The controller 107 also obtains input and output times (time data) of the data.

Figure 2:
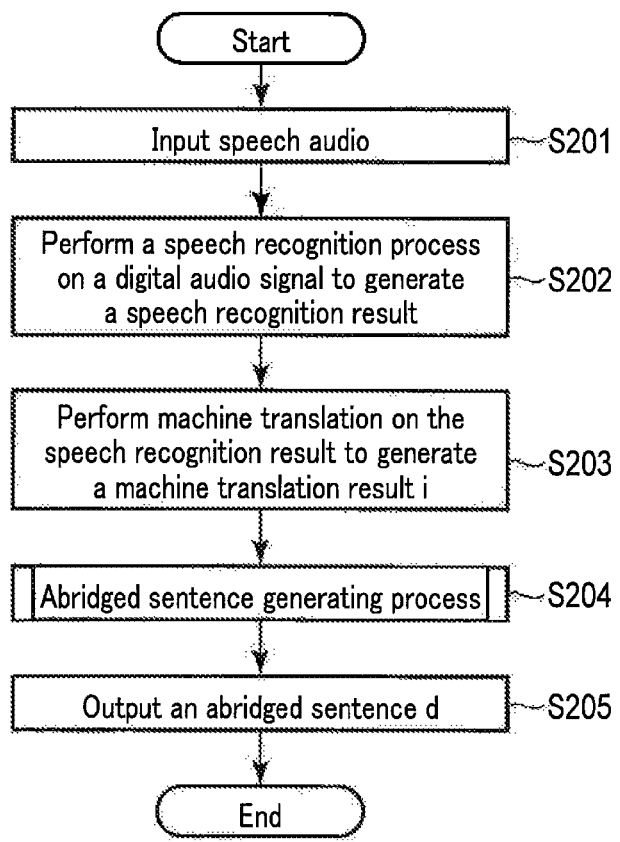
FIG. 2 is a flowchart illustrating an operation of the interpretation apparatus of FIG. 1.

The interpretation apparatus 100 performs the operation illustrated in FIG. 2. The process of FIG. 2 starts when a speaker begins speaking.

The voice input unit 101 receives a speech audio of a speaker in a format of a digital audio signal (step S201). The speech recognition unit 102 performs a speech recognition process on the digital audio signal received in step S201 to generate a speech recognition result in a text format expressing the content of the speech audio (step S202).

The machine translation unit 103 performs machine translation on the speech recognition result, which is a text in a first language, into a text in a second language to generate a machine translation result i in a text format (step S203). After step S203, an abridged sentence generating process (step S204) is performed.

Figure 3:
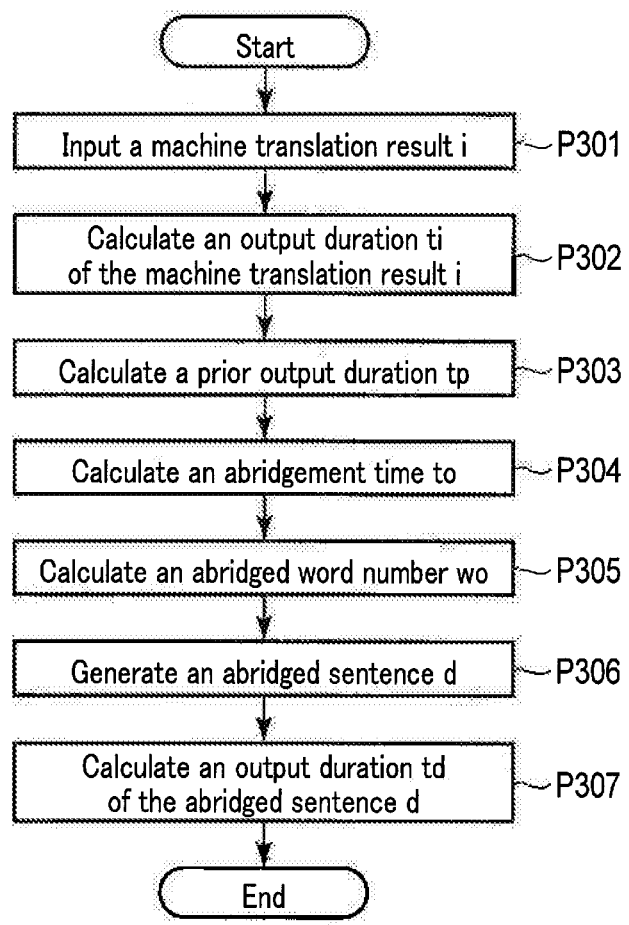
FIG. 3 is a flowchart illustrating an abridged sentence generating process of FIG. 2.
Figure 4:
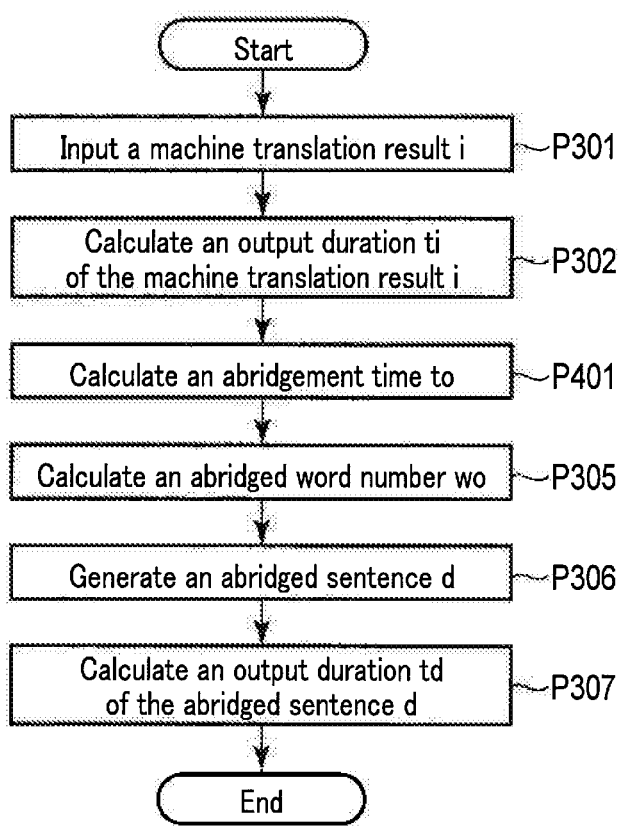
FIG. 4 is a flowchart illustrating an abridged sentence generating process of FIG. 2.

The details of the abridged sentence generating process (step S204) are illustrated in FIG. 3. When the abridged sentence generating process starts, in step P301, the word number calculator 104 receives the machine translation result i generated in step S203.

After step P301, the word number calculator 104 calculates an output duration ti representing a time length corresponding to the total number of words of the machine translation result i (step P302). The output duration ti is calculated with reference to, for example, the number of words which a person can understand in one second. Specifically, assuming that a person can understand four words in one second, when the number of words of the machine translation result i is 10, the output duration ti is 2.5 seconds. When the abridged sentence is audio-output, a time length required for output of a sound generated by voice synthesis is calculated as the output duration ti.

In step P303, when there is an abridged sentence corresponding to a prior machine translation result generated prior to the machine translation result i, the word number calculator 104 calculates a prior output duration tp based on a time when generation of the machine translation result i ends (translation end time) and a time when output of the abridged sentence corresponding to the other machine translation result ends (output end time)

For example, the word number calculator 104 may calculate, as the prior output duration tp, a time difference between the translation end time of the machine translation result i and the output end time of the abridged sentence corresponding to the prior machine translation result When there is no abridged sentence corresponding to the prior machine translation result, or output of the abridged sentence corresponding to the prior machine translation result had ended, the word number calculator 104 determines that the prior output duration tp is zero.

In step P304, the word number calculator 104 may calculate the prior output duration tp as an abridgement time to. Alternatively, the word number calculator 104 may calculate, as the abridgement time to, a time difference between the estimated output end time of the machine translation result i and the time obtained by adding, to the speech end time, the permissible delay time from the speech end time to the output end time of the abridged sentence. The estimated output end time of the machine translation result i is the time obtained by adding, to the translation end time, the time length corresponding to the total number of words included in the machine translation result (i.e., output duration ti) and the prior output duration tp. When the abridgement time to takes a negative value, the word number calculator 104 determines that the abridgement time to is zero. The permissible delay time may be different depending on the viewer, or may be an initial value set in the system.

In step P305, the word number calculator 104 calculates an abridged word number wo representing the number of words corresponding to the abridgement time to. The abridged word number wo is calculated with reference to, for example, the number of words which a person can understand in one second. Specifically, assuming that a person can understand four words in one second, when the abridgement time to is 0.5 seconds, the abridged word number wo is two. When a text of the abridged sentence is audio-output, the abridged word number wo may be calculated in accordance with the read rate of voice synthesis.

In step P306, the abridged sentence generator 105 generates an abridged sentence d by omitting at least the abridged word number wo of words from the machine translation result When the abridged word number wo is zero, the machine translation result i is output as the abridged sentence d.

In step P307, the abridged sentence generator 105 calculates an output duration td representing a time length corresponding to the total number of words of the abridged sentence d. For example, the output duration td is calculated in a manner similar to step P302 After step P307, the abridged sentence generating process of FIG. 3 ends, and the process proceeds to step S205 in FIG. 2, In step S205, the output unit 106 outputs the abridged sentence d for the output duration td. After step S205, the process of FIG. 2 ends.

As another example, the abridged sentence generating process (step S204) may be the process illustrated in FIG. When the abridged sentence generating process starts, in step P301, the word number calculator 104 receives the machine translation result i generated in step S203.

After step P301, the word number calculator 104 calculates an output duration ti representing a time length corresponding to the total number of words of the machine translation result i (step P302).

In step P401, the word number calculator 104 calculates an abridgement time to based on the output duration ti and a time length during which input of the voice audio continues (input duration). For example, the word number calculator 104 may calculate the abridgement time to by subtracting the input duration from the output duration ti The process after step P305 is the same as that described above, and a description thereof is omitted.

In the above-described steps, time lengths corresponding to the total number of words are calculated as the output duration ti of the machine translation result i and the output duration td of the abridged sentence d; however, time lengths corresponding to the total number of letters maybe calculated.

A specific example of the operation result of an interpretation apparatus which is a comparative example of the interpretation apparatus 100 according to the first embodiment is shown in FIG. 6. The operation of this interpretation apparatus outputs machine translation results corresponding to speech audio. A series of speeches shown as speech recognition results in FIG. 6 are processed in the order of speech start time. The machine translation results corresponding to the series of speeches are generated at a translation end time. FIG. 6 shows output start times and output end times etc. of machine translation results corresponding to speech recognition results.

According to the operation result shown in FIG. 6, machine translation results are simply output, and there is a time lag between the current speech and output of the machine translation result corresponding to the current speech. For example, the output start time (12:00:24.050) of the machine translation result "どの要素が現代の システム用の最も重要なものか知っ ていますか。" corresponding to the seventh speech " Do you know what element is the most important for modern systems?" is approximately 3.5 seconds later than the seventh speech end time (12:00:20.600). Besides, the seventh machine translation result is output after the speech end time (12:00:22.600) of the eighth speech "Yes, that is, yeah, modularity." Therefore, it becomes difficult to understand the correspondence between the speech and the machine translation result corresponding to the speech, which may impede understanding of the speech.

A specific example of the operation result of the interpretation apparatus 100 according to the first embodiment is shown in FIG. 7. A series of speeches shown as speech recognition results in FIG. 7 are processed in the order of speech start time The machine translation results (not shown) corresponding to the series of speeches are generated at a translation end time. FIG. 7 shows output start times and output end times etc, of abridged sentences corresponding to speech recognition results.

Hereinafter, an operation result of the speech interaction apparatus 100 according to the first embodiment will be described based on FIG. 7 with reference to the flowcharts of FIGS. 2 and 3. In the example of FIG. 7, the word number calculator 104 calculates, as the prior output duration tp, a time difference between the translation end time of the machine translation result i and the output end time of the abridged sentence corresponding to the prior machine translation result. The machine translation results not shown are the same as those shown in FIG. 6, and descriptions of some steps will be omitted.

Regarding the first speech, the machine translation unit 103 performs machine translation on the first speech recognition result "When I was young," to generate the first machine translation result " 私が若かった頃 " (step S203).

Since the number of morphemes (hereinafter referred to as "number of words") of the first machine translation result is five, the word number calculator 104 calculates 1.25 seconds as the output duration (step P302). Since there is not a prior machine translation result generated prior to the first machine translation result at the first machine translation end time (12:00:01.200), the word number calculator 104 determines that the prior output duration tp is zero (step P303). Consequently, the word number calculator 104 determines that the abridgement time to is zero (step P304), and that the abridged word number wo is zero (step P305).

Since there are no words to be omitted, the abridged sentence generator 105 outputs the first machine translation result as the first abridged sentence (step P306). The abridged sentence generator 105 calculates 1.25 seconds as the output duration of the first abridged sentence (step P307) The output unit 106 outputs the first abridged sentence for 1.25 seconds from the first machine translation end time (step S205).

Regarding the second speech, the machine translation unit 103 performs machine translation on the second speech recognition result "I met a great book called 'The Art of System Development'" to generate the second machine translation result "私は『システム開発 の技術』と呼ばれ る素晴らしい本に会いました。" (step S203).

Since the number of words of the second machine translation result is 15, the word number calculator 104 calculates 3.75 seconds as the output duration (step P302). Since output of the first machine translation result (first abridged sentence) had finished at the second machine translation end time (12:00:04.800), the word number calculator 104 determines that the prior output duration tp is zero (step P303). Consequently, the word number calculator 104 determines that the abridgement time to is zero (step P304), and that the abridged word number wo is zero (step P305).

Since there are no words to be omitted, the abridged sentence generator 105 outputs the second machine translation result as the second abridged sentence (step P306). The abridged sentence generator 105 calculates 3.75 seconds as the output duration of the second abridged sentence (step P307). The output unit 106 outputs the second abridged sentence for 3.75 seconds from the second machine translation end time (step S205).

Regarding the third speech, the machine translation unit 103 performs machine translation on the third speech recognition result "which is known as the programmers' bible." to generate the third machine translation result "それはプログラマの聖書として知 られています。" (step S203).

Since the number of words of the third machine translation result is 12, the word number calculator 104 calculates 3 seconds as the output duration (step P302). Since the second abridged sentence is being output (12:00:04.800-12:00:08.550) at the third machine translation end time (12:00:07.400), the word number calculator 104 calculates a prior output duration tp (step P303) The prior output duration tp is 1.15 seconds, which is obtained by subtracting the third machine translation end time from the second abridged sentence output end time (12:00:08.550). The word number calculator 104 calculates the prior output duration tp as the abridgement time to (step P304) and calculates 4.6 as the abridged word number wo (step P305).

The abridged sentence generator 105 apples the rule "3, Subject pronoun" illustrated in FIG. 5, and determines "それは" in the third machine translation result as words to be omitted. Accordingly, the number of words to be omitted "それ/は" is two. Since all the abridgement rules have been applied, the abridged sentence generator 105 generates the abridged sentence "プログラマの聖 書として知 られています" (step P306).

Since the number of words of the abridged sentence (third abridged sentence) corresponding to the third machine translation result is 10, the abridged sentence generator 105 calculates 2.5 seconds as the output duration (step P307). The output unit 106 outputs the third abridged sentence for 2.5 seconds from the output end time of the second abridged sentence (step S205).

Regarding the fourth speech, the machine translation unit 103 performs machine translation on the fourth speech recognition result "It was written by, you know, a famous engineer." to generate the fourth machine translation result "それは、ご存じ の様に、有名なエ ンジニアによって 書かれました。" (step S203). The subsequent processes are the same as those on the third speech, and only the value obtained in each step will be indicated, while omitting descriptions of the processes. The word number calculator 104 calculates 4 seconds as the output duration of the machine translation result (step P302), 0.55 seconds as the prior output duration and the abridgement time (steps P303 and P304), and 2.2 as the abridged word number (step P305).

The abridged sentence generator 105 applies the rule "1, Interjection" illustrated in FIG. 5, and determines "ご存じの様に" in the fourth machine translation result as words to be omitted. Accordingly, the number of words to be omitted "ご 存じ/の/様/に" is four. Since the total number of words to be omitted is larger than the abridged word number, the abridged sentence generator 105 generates the abridged sentence "それ は、有名なエン ジニアによって 書かれました。" (step P306).

Since the number of words of the abridged sentence (fourth abridged sentence) corresponding to the fourth machine translation result is 12, the abridged sentence generator 105 calculates 3 seconds as the output duration (step P307). The output unit 106 outputs the fourth abridged sentence for 3 seconds from the output end time of the third abridged sentence (step S205). The fifth and subsequent processes are the same as the ones described above, and descriptions thereof are omitted.

According to the operation result of FIG. 7, generation of appropriate abridged sentences reduces the delay from the current speech and the output of the abridged sentence corresponding to the current speech. For example, the output start time (12:00:21.950) of the abridged sentence "どの要素が現代のシステム 用の最も重要なも のか知っていますか。" corresponding to the seventh speech is approximately 1.4 seconds later than the seventh speech end time (12:00:20.600). In addition, the seventh abridged sentence is output prior to the speech end time (12:00:22.600) of the eighth speech. Therefore, it becomes easier to understand the correspondence between the speech and the abridged sentence corresponding to the speech, which facilitates understanding of the speech.

As described above, the interpretation apparatus according to the first embodiment calculates the number of words (abridged word number), which is 0 or a larger value, based on a time when a machine translation result corresponding to a speech audio is generated and a time when output relating to a prior machine translation result generated prior to the machine translation result ends,. Alternatively, the interpretation apparatus calculates the abridged word number based on a time length during which input of the speech audio continues and a time length corresponding to the total number of words included in the machine translation result corresponding to the speech audio. The interpretation apparatus omits at least the abridged word number of words from the machine translation result to generate an abridged sentence output while being associated with the speech audio. Therefore, this interpretation apparatus can suppress an accumulative increase of the delay from the start of speech to the start of output of a translation result corresponding to the speech.

The interpretation apparatus 100 according to the first embodiment may designate an output end time (i.e., an output start time of an abridged sentence associated with the next speech) by an instruction of a viewer. For example, a viewer may instruct the interpretation apparatus 100 to output the next abridged sentence upon having finished reading the current abridged sentence. Alternatively, the interpretation apparatus 100 may restore an omitted word for an output in accordance with a user's instruction. At that time, the interpretation apparatus 100 may extend the output duration in accordance with the number of restored words.

The instructions indicated in the operation procedure of the above-described embodiment can be carried out based on a software program. It is possible to configure a general-purpose computer system to store this program in advance and to read the program in order to perform the same advantages as that performed by the above-described interpretation apparatus. The instructions described in the above embodiment are stored in a magnetic disc (flexible disc, hard disc, etc.), an optical disc (CD-ROM, CD-R, CD-RW, DVD-ROM, DV±R, DVD±RW, Blu-ray (registered trademark) disc, etc.), a semiconductor memory, or a similar storage medium, as a program executable by a computer As long as the storage medium is readable by a computer or a built-in system, any storage format can be adopted. An operation similar to the operation of the interpretation apparatus of the above-described embodiment can be realized if a computer reads a program from the storage medium, and executes the instructions written in the program on the CPU based on the program. A program may, of course, also be obtained or read by a computer through a network.

Furthermore, an operating system (OS) working on a computer, database management software, middleware (MW) of a network, etc. may execute a part of processes for realizing the present embodiment based on instructions from a program installed from a storage medium onto a computer or a built-in system.

Moreover, the storage medium according to the present embodiment is not limited to a medium independent from a system or a built-in system; a storage medium storing or temporarily storing a program downloaded through LAN or the Internet, etc, is also included in the storage medium according to the present embodiment.

In addition, the storage medium according to the present embodiment is not limited to one, and covers cases where the processes according to the present embodiment are carried out by using multiple storage media, and can take any configuration.

The computer or built-in system in the present embodiment is used to execute each process in the present embodiment based on a program stored in a storage medium, and may be an apparatus consisting of a PC or a microcomputer, etc. or a system, etc. in which a plurality of apparatuses are connected through a network.

The computer in the present embodiment is not limited to a PC; it may be a processor controller, a microcomputer, etc. included in an information processor, and is a generic name for a device and apparatus that can realize the functions disclosed in the present embodiment by a program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions The accompanying claims and their equivalents are intended to cover such forms or modifications as would fall within the scope and spirit of the inventions.

What is claimed is:

1. An interpretation apparatus, comprising:
a speech recognition unit that performs a speech recognition process on an input speech audio to generate a speech recognition result;
a translator that performs machine translation on the speech recognition result from a first language into a second language to generate a machine translation result;
a calculator that calculates a word number based on (a) a first time when the machine translation result is generated and a second time when output relating to a prior machine translation result generated prior to the machine translation result ends, the word number being 0 or larger, or (b) a time length during which input of the speech audio continues and a time length corresponding to a total number of words included in the machine translation result corresponding to the speech audio, the word number being 0 or larger; and
a generator that omits at least the word number of words from the machine translation result to generate an abridged sentence output while being associated with the speech audio.

2. The apparatus of claim 1, wherein
the calculator calculates the word number based on a delay time from the generation of the machine translation result to the end of the output relating to the prior machine translation result.

3. The apparatus of claim 1, wherein
the calculator calculates the word number further based on a time length corresponding to a total number of words included in the machine translation result, a third time when input of the speech audio ends, and a permissible delay time from the end of the input of the speech audio to an end of the output of the abridged sentence.

4. The apparatus of claim 1, wherein
the generator determines a word to be omitted from the machine translation result based on importance of the word based on at least one of whether information is new or old, and a prepared word list.

5. An interpretation method, comprising:
performing a speech recognition process on an input speech audio to generate a speech recognition result;
performing machine translation on the speech recognition result from a first language into a second language to generate a machine translation result;
calculating a word number based on (a) a first time when the machine translation result is generated and a second time when output relating to a prior machine translation result generated prior to the machine translation result ends, the word number being 0 or larger, or (b) a time length during which input of the speech audio continues and a time length corresponding to a total number of words included in the machine translation result corresponding to the speech audio, the word number being 0 or larger; and
omitting at least the word number of words from the machine translation result to generate an abridged sentence output by being associated with the speech audio.

6. A non--transitory computer readable medium including computer executable instructions, wherein the instructions, when executed by a processor, cause the processor to perform a method comprising:

performing a speech recognition process on an input speech audio to generate a speech recognition result;

performing machine translation on the speech recognition result from a first language into a second language to generate a machine translation result;

calculating a word number based on (a) a first time when the machine translation result is generated and a second time when output relating to a prior machine translation result generated prior to the machine translation result ends, the word number being 0 or larger, or (b) a time length during which input of the speech audio continues and a time length corresponding to a total number of words included in the machine translation result corresponding to the speech audio, the word number being 0 or larger; and omitting at least the word number of words from the machine translation result to generate an abridged sentence output by being associated with the speech audio.

\* \* \* \* \*